June 9, 1964 M. FARBER 3,136,845
APPARATUS FOR CORRECTION OF HALF-TONE COLOR IMAGES
Filed April 13, 1961
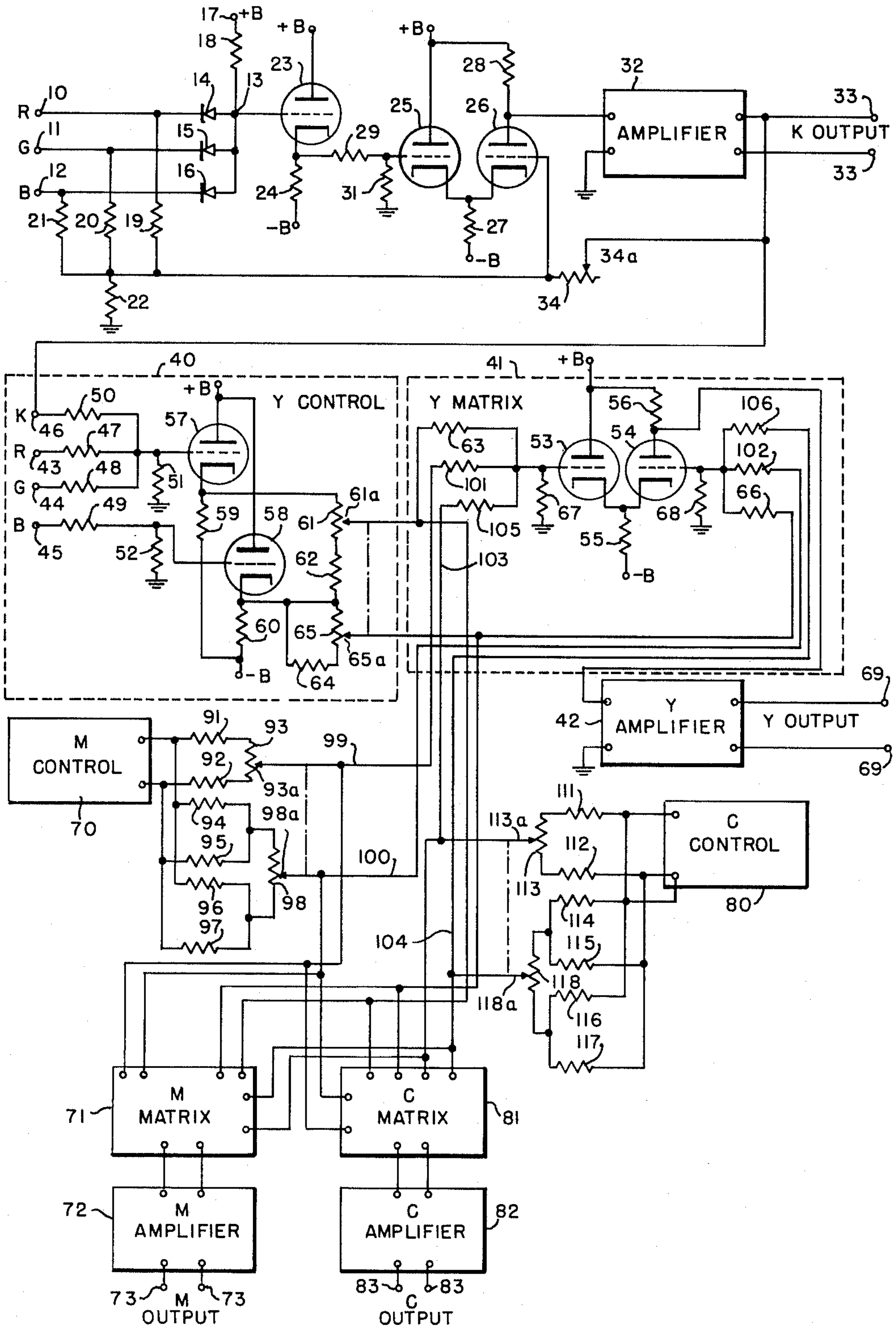

United States Patent Office 3,136,845
Patented June 9, 1964

3,136,845

APPARATUS FOR CORRECTION OF HALF-TONE COLOR IMAGES

Monroe Farber, Jericho, N.Y., assignor to Fairchild Camera and Instrument Corporation, a corporation of Delaware

Filed Apr. 13, 1961, Ser. No. 102,873
12 Claims. (Cl. 178—5.2)

This invention relates to apparatus for the correction of half-tone color images and, while it is of general application, it is particularly useful for correcting the color purity, dominant wavelength, and luminance of half-tone color reproductions.

In the copending application of applicant and Vernon L. Marquart, Serial No. 12,088, filed March 1, 1960, there is described and claimed an apparatus for compressing the color purity or saturation and luminance or brightness of a color image represented on a film transparency or opaque print for reproduction by another medium, for example by letterpress, gravure, or lithographic printing, and the like, having ranges of color purity and luminance different from those of the original copy. Specifically, the electrical signals representative of the various components of the original image are altered to fit the desired operating limits of the printing process and this is done without altering the dominant wavelengths of the reproduced color image.

The output signals of the apparatus of aforesaid copending application produce ideal color images if the reproducing media, for example the printing inks, are ideal but, in practice, such an ideal reproduction cannot be realized. It has become preferred practice to employ four-color reproduction involving the use of a half-tone "black printer" and to reduce the areas of the islands or dots of the half-tone color-separation printers correspondingly, termed undercolor removal. If the printing inks had ideal characteristics, it would only be necessary to remove equal areas from the dots of all three color-separation printers, the amounts removed corresponding to the areas of the dots of the black printer in each elemental image area. However, it has been found that the characteristics of the usual inks are such that equal dot areas in the three color-separation printers do not give a neutral grey. Hence, removal of equal areas of these color-separation printers is not the equivalent of removing a given amount of neutral grey from the resulting image but results in a shift of one or more of the color parameters, color purity, dominant wavelength, and luminance. This problem is accentuated in instances where the amount of undercolor removal is adjustable in operation.

The present invention is directed to the solution of the problem arising from the imperfections in the reproducing media, for example printer's inks. In general, the invention is directed to the computation of the black printer dot area (density) from the equivalent neutral density of the original image, as altered by any prior modification to fit the printing conditions, and to the computation of the color printer-separation dot areas (densities) which are in part dependent on the undercolor removal, that is, the black printer density, to effect a reproduced color image having the characteristics called for by the signals derived from the original copy, which may or may not be corrected as described in aforesaid copending Farber and Marquart application.

The invention is applicable generally to image reproduction by printing processes, for example, ordinary letterpress gravure, and equivalent printing processes.

It is an object of the invention, therefore, to provide a new and improved apparatus for the correction of half-tone color images reproduced by printing or analogous processes by means of which the density of the black printer may be made to represent the neutral density of the under-color removal from the color-separation printers.

It is another object of the invention to provide a new and improved apparatus for the correction of half-tone color images reproduced by printing or analogous processes by means of which the color-separation printers are effective to reproduce the color image without any shift in color purity, dominant wavelength, or luminance due to undercolor removal of fixed or variable amounts, taking into account the imperfections in the image-reproducing media.

In accordance with the invention, apparatus for developing a density-factor correction for the reproduction of half-tone color images from a scanned original color copy comprises input terminals for supplying signals individually representative of a plurality of primary color components of a scanned color copy, circuit means coupled to said input terminals for deriving a first signal representative of the instantaneous composite maximum of the color component signals, circuit means coupled to said input terminals for deriving a second signal representative of the sum of predetermined portions of the color component signals, and circuit means for deriving a third signal representative of the difference of the first and second derived signals, such third signal being representative of the desired density factor. The term "half-tone color images" is used herein and in the appended claims in its generic sense to refer to images reproduced by printing processes in which the reproduced image is broken up into elemental areas either of variable area, as in letterpress printing, or variable depth, as in gravure or intaglio printing, and is to be distinguished from continuous tone images such as reproduced by photographic processes.

Further in accordance with the invention, apparatus for developing a density-factor correction for a given color-separation printer for the reproduction of half-tone color images by media represented by a set of printing colors by means of signals representative of a set of color primaries derived from a scanned original copy comprises input terminals for supplying first signals individually representative of the set of primary color components of a scanned color copy, an input terminal for supplying a second signal representative of a black printer, a plurality of circuit means, each effective to derive a signal representative of a predetermined portion of one of the first signals, such portions represented by each of the circuit means being dependent upon a different one of the color coordinates of the given printing color in terms of the set of color primaries, and means for developing a third signal representative of the algebraic sum of the first signal and the derived signals, such developed signal being representative of the desired density factor.

For a better understanding of the present invention, together with other and further objects thereof, reference is had to the following description taken in connection with the accompanying drawing, while its scope will be pointed out in the appended claims.

Referring now to the drawing:

The single figure is a schematic circuit diagram representing apparatus embodying the invention for the correction of half-tone color images.

Before describing specifically the apparatus for carrying out the invention, it is believed that it would be helpful to give an explanation of the principles underlying the invention and a brief mathemathical explanation of the derivation of the basic relationships that should be satisfied in developing black printer density information and information for the correction of the densities of the color-separation printers.

In the following analysis, it is assumed that the photoelectric pickup scanning the original image develops signals representative of the additive primary color components red, green, and blue (R, G, B); that image reproduction is to be effected by printing processes using the complementary subtractive primary color components yellow, magenta, and cyan (Y, M, C); and that the black printer is considered as the means of adding the required amount of neutral density to the reproduced color image developed from the color signals modified by undercolor removal. The analysis is based upon the further principle that from maximum signals, corresponding to minimum densities and minimum dot areas, the desired correction of the neutral density is effected by adding to the dot areas of the black printer, areas equal to those removed from the color-separation printers at such minimum density. This added density factor may be represented by the function K, which is computed so that it has a value of zero on black and has a certain unit value on the white reference of the copy to be reproduced as "paper-white" (with pinpoint dots on all printers) and which also has unit value on the complementary reference colors representing the fully saturated yellow only, the fully saturated cyan only, and the fully saturated magenta only. This may be represented as $$K=1 \text{ when } \left.\begin{array}{l} R=G=B=1 \text{ (white)} \\ R=Ry, G=Gy, B=By \\ R=Rm, G=Gm, B=Bm \\ R=Rc, G=Gc, B=Bc \end{array}\right\} \quad (1)$$

where the suffixes $y$, $m$, and $c$ refer to the values of the additive primaries R, G, B necessary to produce fully saturated yellow, magenta, and cyan, respectively.

A solution of the simultaneous Equation 1 gives the following:

$$K=H \text{ MAXIMUM OF } (R, G, B)-\alpha R-\beta G-\gamma B \quad (2)$$

where the coefficients H, $\alpha$, $\beta$, and $\gamma$ are determined by the solution of Equation 1. Equation 2 can also be written:

$$K=\text{MAX.} \left\{\begin{array}{l} R+\beta(R-G)+\gamma(R-B) \\ G+\alpha(G-R)+\gamma(G-B) \\ B+\alpha(B-R)+\beta(B-G) \end{array}\right\} \quad (3)$$

which is a special form of $$K=\text{MAX.} \left\{\begin{array}{l} a_1R+b_1G+c_1B \\ a_2R+b_2G+c_2B \\ a_3R+b_3G+c_3B \end{array}\right\} \quad (4)$$

In the latter general equations, the coefficients may be chosen to obtain a K density factor with particular characteristics related to the colors that may be scanned. As discussed hereinafter, the density factor K is useful not only in determining the density of the black printer but also in the computation of the undercolor removal of the color-separation printers.

Equation 2 can be instrumented by a resistance network in which the values of the conductances of the several resistors represent the coefficients of the variable parameters.

Referring now to the drawing, there is represented apparatus for developing black printer and color-separation representative signals for the reproduction of halftone color images from a scanned original color copy and the black printer or K-factor computer will be initially considered, this computer being essentially an instrumentation of Equation 2. It is assumed that, as a result of the scanning of the original copy, the pickup develops signals representative of the three additive primary color components R, G, B. The apparatus of the drawing includes input terminals 10, 11, and 12 for supplying signals representative of the R, G, and B color components of the scanned copy. The apparatus also includes circuit means for deriving a signal representative of the instantaneous composite maximum of such component signals. This circuit means includes a common terminal 13 and unilaterally conductive devices 14, 15, and 16 individually connected between the input terminals 10, 11, 12, respectively, and the common terminal 13. There is also provided means for supplying a bias potential to the common terminal to maintain the devices 14, 15, and 16 conductive. This may take the form of a positive supply terminal 17 connected to the terminal 13 through a current-limiting resistor 18, whereupon the potential of the common terminal 13 constitutes the desired instantaneous maximum signal.

The apparatus further comprises circuit means for deriving a signal representative of the sum of predetermined portions of the component signals R, G, and B. This circuit means may comprise a plurality of circuits including resistors 19, 20, and 21 individually connected to the input terminals 10, 11, and 12, respectively, these circuits having a common portion including a common resistor 22, the other terminal of which is grounded, so that the potential across the resistor 22 constitutes the desired summation signal.

The apparatus further comprises circuit means for deriving a signal representative of the difference of the instantaneous maximum signal and the summation signal, this latter derived signal being representative of the desired density factor. Specifically, the maximum signal at the terminal 13 is applied to a cathode-follower amplifier 23 having a cathode load resistor 24. This amplifier 23 is provided primarily for isolation purposes and, in certain applications, may be omitted. This last circuit means comprises a pair of signal repeaters 25, 26 having a common cathode load resistor 27 and the repeater 26 having an individual anode load resistor 28. Circuits are provided for individually applying the maximum signal and the summation signal to the repeaters 25 and 26 so that the potential across the anode load resistor 28 constitutes the signal representative of the desired density factor. More specifically, the maximum signal appearing across the resistor 24 is applied to the control electrode of the repeater 25, which may be a conventional vacuum tube amplifier, through a resistor 29 and a leak resistor 31 connected between the control electrode and ground. The summation signal appearing across resistor 22 is applied directly to the control electrode of the repeater 26, which also may be a conventional vacuum tube amplifier. The density-factor correction signal appearing across resistor 28 is applied to an amplifier 32 which may be a conventional amplifier of one or more stages. The output of the amplifier 32 is connected to output terminals 33, 33 which may be utilized in a conventional engraving machine for cutting the black printer plate. A portion of the output signal at terminals 33, 33 is fed back to the repeater 26 through an adjustable resistor 34 which, with the resistor 22, forms a voltage-dividing circuit to adjust the amount of signal feedback in accordance with the signal-input level. As described in more detail hereinafter, the output signal at the terminals 33, 33 is also applied to the computer circuits for deriving density-factor corrections for the color-separation signals.

The values of the several resistors of the circuit just described may be determined by the following equations:

$$\left.\begin{array}{l} R_r=\dfrac{(1-H/A)}{\alpha}R_f \\ R_g=\dfrac{(1-H/A)}{\beta}R_f \\ R_b=\dfrac{(1-H/A)}{\gamma}R_f \\ R_o=\left(\dfrac{A}{H}-1\right)R_f \end{array}\right\} \quad (5)$$

where $A$=gain of amplifier 32

$\left.\begin{matrix}R_r\\R_g\\R_b\end{matrix}\right\}$=values of resistors coupled to input terminals R, G, and B, respectively $R_o$=value of resistor 22
$R_f$=value of feedback resistor 34

Coefficients $\left.\begin{matrix}H\\\alpha\\\beta\\\gamma\end{matrix}\right\}$ have values determined by Equation 1

It is believed that the operation of the above-described apparatus as a density-factor correction computer in instrumenting Equation 2 will be clear from the foregoing description. Briefly, the diodes 14, 15, and 16 are maintained conductive by a current from the terminal 17 flowing through the resistor 18 and through the diodes in series with resistors 19, 20, and 21 and the common resistor 22. Due to the unilateral conductivity of the diodes 14, 15, and 16, the circulation of signal current between the terminals 10, 11, and 12 is prevented and only the instantaneous maximum potential is applied to the control electrode of the amplifier 23.

The signal across the resistor 22 is developed by current addition through the resistors 19, 20, and 21 so that predetermined portions of the R, G, and B signals are added in this resistor and the potential thereacross represents the sum of these portions. The instantaneous maximum signal at the terminal 13 is repeated by the cathode-follower 23 and applied with the same polarity to the grid of the amplifier 25. The summation signal across the resistor 22 is applied to the control electrode of the amplifier 26 and, since the output of the amplifier 25 is coupled to the amplifier 26 through the common cathode load resistor 27, the two signals have an opposite effect on the anode current of the amplifier 26 so that the difference signal appears across the load resistor 28. This difference signal is amplified in the unit 32 and applied to the output terminals 33, 33 for utilization in cutting the black printer.

Connected between the output circuit of amplifier 32 and the input circuit of amplifier 26 is a feedback resistor 34 having an adjustable tap 34a which may be adjusted in accordance with variations of input conditions to the system.

One set of printing colors suitable for image reproduction by subtractive printing may be defined as follows, in terms of R, G, and B color components:

| Color | R, percent | G, percent | B, percent | |
|---|---|---|---|---|
| Reference white | 100 | 100 | 100 | (6) |
| Yellow | 80 | 62 | 6 | |
| Magenta | 83 | 19 | 62 | |
| Cyan | 23 | 45 | 71 | |

With these values substituted in Equations 1, 2, and 5, the values of the essential resistance elements of the circuit just described are as follows:

| | | |
|---|---|---|
| Resistor **19** | megohms | 2.2 |
| Resistor **20** | do | 5.6 |
| Resistor **21** | do | 4.7 |
| Resistor **22** | kilohms | 270 |
| Resistor **29** | megohm | 1 |
| Resistor **31** | do | 1 |

Again, before describing specifically apparatus for deriving the corrected color-separation signals, it is believed that it would be helpful to give an explanation of the underlying principles and a brief mathematical explanation of the derivation of the basic relationships that should be satisfied. Assume that the corrected dot area (density) $A_{p1}$ of any printing color may be represented by the following equations:

$$\left.\begin{aligned}A_{p1}&=b_{p1}R+c_{p1}G+d_{p1}B+e_{p1}K\\&=0\text{ when }R=G=B=K\text{ (reference white)}\\&=0\text{ when }K=1, R=R_{p2}, G=G_{p2}, B=B_{p2}\\&=0\text{ when }K=1, R=R_{p3}, G=G_{p3}, B=B_{p3}\\&=1\text{ when }K=1, R=R_{p1}, G=G_{p1}, B=B_{p1}\end{aligned}\right\}\quad(7)$$

where the subscripts $p_1$, $p_2$, and $p_3$ refer to the values of the additive primaries R, G, B necessary to produce fully saturated printing colors $p_1$, $p_2$, and $p_3$, respectively. The values and the polarities of the coefficients $b_{p1}$, $c_{p1}$, $d_{p1}$, and $e_{p1}$ may be found by the solution of simultaneous Equations 7. Similarly, the corresponding coefficients for the corrected dot areas $A_{p2}$ and $A_{p3}$ may be found in the same manner.

Substituting in Equations 7 the values from Table 6 gives the following for the yellow corrected dot area:

$$A_y=.065R+.607G-1.322B+.650K \quad (8)$$

Equation 8 can be instrumented by means of a resistance network or matrixing circuit, as described hereinafter, by means of which there is developed an electrical signal representative of the corrected yellow dot area $A_y$.

In addition, provisions are usually desired for adding to the corrected color-separation signal selected amounts of the other two color-separation signals, to take into account the spectral characteristics of the printing inks or other reproducing media used. This may be effected by suitable matrixing circuits as described hereinafter.

Referring again to the drawing, there is represented apparatus for developing a density-factor correction for each of a plurality of color-separation printers for the reproduction of half-tone color images by media represented by a set of printing colors, for example yellow, magenta, and cyan, by means of signals representative of a set of color primaries, for example red, green, and blue, derived from a scanned original copy. Only the apparatus for developing the density-factor correction for the yellow color-separation printer is shown in detail since the apparatus for developing the similar correction for the magenta and cyan color-separation printers have identical circuit configurations. The apparatus for developing the corrected yellow color-separation signals consists essentially of a Y control unit 40, a Y matrix unit 41, and a Y amplifier unit 42. The unit 40 is provided with input terminals 43, 44, and 45 to which are supplied signals individually representative of the set of primary color components R, G, and B from the original copy scanner. It is also provided with an input terminal 46 for supplying a signal K representative of the black printer, as described above.

The apparatus for developing the density-factor correction also includes a plurality of circuit means, each effective to derive a signal representative of a predetermined portion of one of the signals R, G, and B. These circuit means are comprised in the Y control unit 40 and may be in the form of a plurality of resistors 47, 48, and 49 individually coupled to the input terminals 43, 44, 45, respectively, each having a conductance representative of such portion of its respective input signal, such portion represented by each of the resistors 47, 48, 49 being dependent upon a different one of the color coordinates of the given printing color, in this instance yellow, in terms of the input set of primaries R, G, and B. The Y control unit 40 further includes a resistor 50 coupled to the input terminal 46 and having a conductance representative of a predetermined portion of the black printer signal K.

The Y control unit further includes means for developing a signal representative of the algebraic sum of predetermined portions of the R, G, B, and K signals, specifically representative of the algebraic sum of the currents through the resistors 47, 48, 49, 50, such developed signal being representative of the desired density factor. More specifically, the resistors 47, 48, 49, 50 have conductances representative of the coefficients of R, G, B, and K, respectively, of Equation 8. The values of the resistors are determined in accordance with the following table:

| Input | Resistor | Coefficient | Conductance (micromhos) | Resistance |
|---|---|---|---|---|
| K | 50 | .650 | 3.94 | 230 kilohms. |
| R | 47 | .065 | .39 | 2.4 megohms. |
| G | 48 | .607 | 3.67 | 270 kilohms. |
| B | 49 | 1.322 | 8 | 120 kilohms. |

The Y control unit 40 further comprises circuit means for summing the currents through such of the resistors 47, 48, 49, 50 as correspond to coefficients of Equation 8 of a given polarity. As shown, circuits connect in parallel the resistors 47, 48, and 50, representative of coefficients of positive polarity, the circuits having a common portion including a resistor 51, one terminal of which is grounded. There are provided other circuit means for summing the currents through such of the resistors as correspond to coefficients of Equation 8 of opposite, that is negative, polarity. Again, the circuit means would connect such resistors in parallel but, in this instance, only the coefficient of the B signal is negative so that only this single resistor is included in this latter circuit means. It too is connected to ground through a resistor 52 of a value equal to that of resistor 51 and may be of the order of 10 megohms.

The density-factor correction apparatus further includes means for developing a signal representative of the algebraic sum of the summation signals, that is, the signals developed across resistors 51 and 52, such developed signal being representative of the desired density factor. This means is comprised in the Y matrix unit 41 and may be specifically in the form of a pair of signal repeaters 53 and 54 having a common cathode load impedance or resistor 55 returned to ground through the source —B. At least one of the repeaters, for example the repeater 54, has an anode load impedance or resistor 56 which, together with the anode of the repeater 53, is connected to a suitable source +B.

The Y matrix unit 41 further comprises circuit means for individually applying the summation signals across resistors 51, 52 to the signal input electrodes of the repeaters 53 and 54, respectively, whereby the signal developed across the anode load resistor 56 is representative of the desired yellow density-factor correction. This circuit means preferably is in the form of a pair of isolating cathode-follower signal repeaters 57 and 58 having individual cathode load resistors 59 and 60, respectively, returned to ground through the source —B, while the anodes of these repeaters are connected directly to the source +B. The signal across resistor 51 is applied to the input electrode of repeater 57 while that across resistor 52 is applied to the input electrode of repeater 58. The sum of selected portions of the signals developed across resistors 59 and 60 is derived from an adjustable contact **61*a* of a resistor 61 comprising, with a fixed resistor 62 in series therewith, a voltage-dividing circuit connected between the high-potential terminals of resistors 59 and 60. The adjustable contact 61*a* is connected to the signal input electrode of repeater 53 through a resistor 63. The signal across resistor 60 is applied to the signal input electrode of repeater 54 through an impedance-matching circuit comprising a fixed resistor 64 and a resistor 65 having an adjustable contact 65*a* and through a series resistor 66. Grid-leak resistors 67 and 68 may be provided for the input electrodes of the signal repeaters 53 and 54, respectively. The output signal across the resistor 56 is applied to the Y amplifier unit 42 so that the signal appearing at its output terminals 69, 69** represents the corrected Y signal.

Disregarding for the moment the cross-couplings between the yellow correction channel and the magenta and cyan correction channels, it is believed that the operation of the yellow correction channel will be clear from the foregoing description. The selection of the values of resistors 47, 48, 49, and 50, as described above, together with the summation of the currents through the resistors of the group corresponding to coefficients of Equation 8 of the same polarity, together with the algebraic summation of the summation signals across resistors 51 and 52 by the repeaters 53 and 54, constitutes an instrumentation of Equation 8, so that the signal output across resistor 56 is representative of the corrected yellow dot area or density. This signal, amplified in the unit 42, may then be utilized to form the yellow printer, either by photoelectric engraving, as in a machine of the type described in Boyajean Patent Re. 23,914, or by other types of electric scanners.

The magenta density-factor correction channel comprising the M control unit 70, the M matrixing unit 71, and the M amplifier unit 72 and the cyan density-factor correction channel comprising the C control unit 80, the C matrixing unit 81, and the C amplifier unit 82 structurally may be identical to the yellow density-factor correction channel described in detail, except that the values of the resistors in the control units 70 and 80 will be determined by Equation 8 for each particular printing color. Assuming a set of reference primaries represented by Table 6, the values of the resistors for use in the M control unit 70 and the C control unit 80, corresponding to the coefficients of K, R, G, and B, were determined as follows:

| Coefficient | M Control Unit 70 | C Control Unit 80 |
|---|---|---|
| K | 1 megohm | 300 kilohms. |
| R | 200 kilohms | 220 kilohms. |
| G | 120 kilohms | 1.6 megohms. |
| B | 430 kilohms | 1.3 megohms. |

However, in the M control unit, the coefficients of K, R, and B are positive and the currents through their respective resistors are summed and the coefficient of G is negative, while in the C control unit the coefficients of K, G, and B are positive and the currents through their respective resistors are summed and the coefficient of R is negative.

The contacts **61*a* and 65*a* of the voltage-divider resistors 61, 65**, respectively, are provided so that the operator of the apparatus may adjust the amount of the yellow signal for a given yellow patch, depending upon the color purity of the yellow reproducing medium used. Since the printing colors of the reproducing media will ordinarily be subject to change due to changes in printing inks or other practical printing operations, by providing means for adding to the principal density-factor signal of each printing color predetermined portions of the corresponding density-factor signals developed by the other channels, signals can be developed representing the changed set of ink colors. To this end, there are provided cross-couplings between each of the channels and each of the other channels.

Specifically, the M control unit 70 is connected to an output circuit comprising fixed resistors 91, 92 in series with a resistor 93 having an adjustable contact **93*a* from which the resultant magenta density-factor signal is derived. Also connected across the output of the M control unit 70 is an impedance-matching resistor network comprising a first pair of fixed resistors 94 and 95 connected in series across the output, a second pair of resistors 96 and 97 also connected across the output circuit, and a resistor 98 having an adjustable contact 98*a* interconnecting the junctions of resistors 94, 95 and 96, 97. The adjustable contacts 93*a* and 98*a* are connected through circuits 99 and 100, respectively, and series resistors 101** and 102, respectively, to the input electrodes of repeaters 53 and 54, respectively. The circuits 99, 100 are also similarly connected to the M matrix unit 71 and the C matrix unit 81, as shown.

Similarly, the output of the C control unit 80 is connected to a resistance network 111–118 connected similarly to the network 91–98 across the output of the M control unit 70. Again, the signals appearing at contacts 113*a* and 118*a* are applied by way of circuits 103 and 104 through series resistors 105 and 106, respectively, to the signal repeaters 53 and 54, respectively, of the Y matrix unit 41. The circuits 103 and 104 are similarly connected to the C matrix unit 81 and the M matrix unit 71. The output of the C matrix unit 81 is amplified in the unit 82, the output of which is connected to terminals 83, 83. It is obvious that the operation of the magenta density-factor correction channel, comprising the units 70, 71, and 72, and of the cyan density-factor correction channel, comprising units 80, 81, and 82, is identical with that of the yellow density-factor correction channel, comprising the units 40, 41, and 42, as described above.

The resistors 47, 48, 49, and 50 of the Y control unit 40, together with corresponding resistors of the M control unit 70 and the C control unit 80, may be conveniently assembled in the form of interchangeable plugboards so that the apparatus may be readily adapted for use in printing processes employing different inks having different yellow, magenta, and cyan printing colors or with scanners set to respond to different red, green, and blue primaries merely by substituting a new plugboard with resistors having values determined by Equations 5 for the particular primaries involved.

The Y, M, and C signal outputs are corrected for fixed or variable amounts of undercolor removal and may be used as color printer signals by individually subtracting them from the K signal in any well known manner. Alternatively, they may be considered as correction signals subject to further correction in accordance with other nonlinearities in the system.

While the invention has been described in terms of primary R, G, and B signals derived from scanning the original copy and of the use of Y, M, and C printing colors, it will be understood that it is of general application to any set of derived primary colors and any set of printing colors, some or all of which may be the same as the derived primary colors.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for developing a density-factor correction for the reproduction of half-tone color images from a scanned original color copy comprising: input terminals for supplying signals individually representative of a plurality of primary color components of a scanned color copy; circuit means coupled to said input terminals for deriving a first signal representative of the instantaneous composite maximum of said component signals; circuit means coupled to said input terminals for deriving a second signal representative of the sum of predetermined portions of said component signals; and circuit means for deriving a third signal representative of the difference of said first and second signals, said third signal being representative of the desired density factor.

2. Apparatus for developing a density-factor correction for the reproduction of half-tone color images from a scanned original color copy comprising: input terminals for supplying signals individually representative of the primary red, green, and blue color components of a scanned color copy; circuit means coupled to said input terminals for deriving a first signal representative of the instantaneous composite maximum of said component signals; circuit means coupled to said input terminals for deriving a second signal representative of the sum of predetermined portions of said component signals; and circuit means for deriving a third signal representative of the difference of said first and second signals, said third signal being representative of the desired density factor.

3. Apparatus for developing a density-factor correction for the reproduction of half-tone color images from a scanned original color copy comprising: input terminals for supplying signals individually representative of a plurality of primary color components of a scanned color copy; a common terminal; a unilaterally conductive device connected between each of said input terminals and said common terminal; means for supplying a bias potential to said common terminal to maintain said devices conductive, the potential of said common terminal constituting a first signal representative of the instantaneous composite maximum of said component signals; circuit means for deriving a second signal representative of the sum of predetermined portions of said component signals; and circuit means for deriving a third signal representative of the difference of said first and second signals, said third signal being representative of the desired density factor.

4. Apparatus for developing a density-factor correction for the reproduction of half-tone color images from a scanned original color copy comprising: input terminals for supplying signals individually representative of a plurality of primary color components of a scanned color copy; circuit means coupled to said input terminals for deriving a first signal representative of the instantaneous composite maximum of said component signals; a circuit including a resistor connected to each of said terminals, said circuits having a common portion including a common resistor, the potential across said common resistor constituting a second signal representative of the sum of predetermined portions of said component signals; and circuit means for deriving a third signal representative of the difference of said first and second signals, said third signal being representative of the desired density factor.

5. Apparatus for developing a density-factor correction for the reproduction of half-tone color images from a scanned original color copy comprising: input terminals for supplying signals individually representative of a plurality of primary color components of a scanned color copy; circuit means coupled to said input terminals for deriving a first signal representative of the instantaneous composite maximum of said component signals; circuit means coupled to said input terminals for deriving a second signal representative of the sum of predetermined portions of said component signals; a pair of signal repeaters having a common cathode load and at least one of said repeaters having an individual anode load; and circuits for individually applying said first and second signals to said repeaters, the potential across said anode load constituting a third signal representative of the difference of said first and second signals, said third signal being representative of the desired density factor.

6. Apparatus for developing a density-factor correction for a given color-separation printer for the reproduction of half-tone color images by media represented by a set of printing colors by means of signals representative of a set of color primaries derived from a scanned original copy comprising: input terminals for supplying first signals individually representative of said set of primary color components of a scanned color copy; an input terminal for supplying a second signal representative of a black printer; a plurality of circuit means individually coupled to said input terminals, each effective to derive a signal representative of a predetermined portion of one of said first signals, said portions represented by each of said circuit means being dependent upon a different one of the color coordinates of said given printing color in terms of said set of color primaries; and means for developing a third signal representative of the algebraic sum of said second signal and said derived signals, said developed signal being representative of the desired density factor.

7. Apparatus for developing a density-factor correction for a given color-separation printer for the reproduction of half-tone color images by media represented by yellow, magenta, and cyan printing colors by means of signals representative of red, green, and blue primaries derived from a scanned original copy comprising: input terminals for supplying first signals individually representative of said red, green, and blue primary color components of a scanned color copy; an input terminal for supplying a second signal representative of a black printer; a plurality of circuit means individually coupled to said input terminals, each effective to derive a signal representative of a predetermined portion of one of said first signals, said portions represented by each of said circuit means being dependent upon a different one of the color coordinates of said given printing color in terms of said red, green, and blue primaries; and means for developing a third signal representative of the algebraic sum of said second signal and said derived signals, said developed signal being representative of the desired density factor.

8. Apparatus for developing a density-factor correction for a given color-separation printer for the reproduction of half-tone color images by media represented by a set of printing colors by means of signals representative of a set of color primaries derived from a scanned original copy comprising: input terminals for supplying first signals individually representative of said set of primary color components of a scanned color copy; an input terminal for supplying a second signal representative of a black printer; a plurality of resistors individually coupled to said input terminals, each having a conductance representative of a predetermined portion of one of said first signals, said portions represented by each of said resistors being dependent upon a different one of the color coordinates of said given printing color in terms of said set of color primaries; a resistor coupled to said input terminal having a conductance representative of a predetermined portion of said second signal; and means for developing a third signal representative of the algebraic sum of the currents through said resistors, said developed signal being representative of the desired density factor.

9. Apparatus for developing a density-factor correction for a given color-separation printer for the reproduction of half-tone color images by media represented by a first set of printing colors by means of signals representative of a set of color primaries derived from a scanned original copy comprising: input terminals for supplying first signals individually representative of said set of primary color components of a scanned color copy; an input terminal for supplying a second signal representative of a black printer; a plurality of resistors individually coupled to said input terminals, each having a conductance representative of one of the coefficients $b_{p1}$, $c_{p1}$, $d_{p1}$, and $e_{p1}$ in the equations:

$$
\begin{aligned}
A_{p1} &= b_{p1}R+c_{p1}G+d_{p1}B+e_{p1}K \\
&= 0 \text{ when } R=G=B=K \text{ (reference white)} \\
&= 0 \text{ when } K=1, R=R_{p2}, G=G_{p2}, B=B_{p2} \\
&= 0 \text{ when } K=1, R=R_{p3}, G=G_{p3}, B=B_{p3} \\
&= 1 \text{ when } K=1, R=R_{p1}, G=G_{p1}, B=B_{p1}
\end{aligned}
$$

where the several parameters have the significance indicated in the specification; circuit means for summing the currents through said resistors corresponding to coefficients of a given polarity; circuit means for summing the currents through said resistors corresponding to coefficients of the opposite polarity; and means for developing a third signal representative of the algebraic sum of said summation signals, said developed signal being representative of the desired density factor.

10. Apparatus for developing a density-factor correction for a given color-separation printer for the reproduction of half-tone color images by media represented by a set of printing colors by means of signals representative of a set of color primaries derived from a scanned original copy comprising: input terminals for supplying first signals individually representative of said set of primary color components of a scanned color copy; an input terminal for supplying a second signal representative of a black printer; a plurality of resistors individually coupled to said input terminals, each having a conductance representative of one of the coefficients $b_{p1}$, $c_{p1}$, $d_{p1}$, and $e_{p1}$ in the equations:

$$
\begin{aligned}
A_{p1} &= b_{p1}R+c_{p1}G+d_{p1}B+e_{p1}K \\
&= 0 \text{ when } R=G=B=K \text{ (reference white)} \\
&= 0 \text{ when } K=1, R=R_{p2}, G=G_{p2}, B=B_{p2} \\
&= 0 \text{ when } K=1, R=R_{p3}, G=G_{p3}, B=B_{p3} \\
&= 1 \text{ when } K=1, R=R_{p1}, G=G_{p1}, B=B_{p1}
\end{aligned}
$$

where the several parameters have the significance indicated in the specification; circuits connecting in parallel said resistors corresponding to coefficients of a given polarity, said circuits having a common portion including a first resistor; circuits connecting in parallel said resistors corresponding to coefficients of the opposite polarity, said circuits having a common portion including a second resistor; and means for developing a third signal representative of the algebraic sum of the signals developed across said first and second resistors, said developed signal being representative of the desired density factor.

11. Apparatus for developing a density-factor correction for a given color-separation printer for the reproduction of half-tone color images by media represented by a set of printing colors by means of signals representative of a set of color primaries derived from a scanned original copy comprising: input terminals for supplying first signals individually representative of said set of primary color components of a scanned color copy; an input terminal for supplying a second signal representative of a black printer; a plurality of resistors individually coupled to said input terminals, each having a conductance representative of one of the coefficients $b_{p1}$, $c_{p1}$, $d_{p1}$, and $e_{p1}$ in the equations:

$$
\begin{aligned}
A_{p1} &= b_{p1}R+c_{p1}G+d_{p1}B+e_{p1}K \\
&= 0 \text{ when } R=G=B=K \text{ (reference white)} \\
&= 0 \text{ when } K=1, R=R_{p2}, G=G_{p2}, B=B_{p2} \\
&= 0 \text{ when } K=1, R=R_{p3}, G=G_{p3}, B=B_{p3} \\
&= 1 \text{ when } K=1, R=R_{p1}, G=G_{p1}, B=B_{p1}
\end{aligned}
$$

where the several parameters have the significance indicated in the specification; circuit means for summing the currents through said resistors corresponding to coefficients of a given polarity; circuit means for summing the currents through said resistors corresponding to coefficients of the opposite polarity; a pair of signal repeaters having a common cathode load impedance and at least one of said repeaters having an anode load impedance; and circuit means for individually applying said summation signals to said repeaters, whereby the signal developed across said anode load impedance is representative of the desired density factor.

12. Apparatus for developing a density-factor correction for each of a plurality of color-separation printers for the reproduction of half-tone color images by media represented by a set of printing colors by means of signals representative of a set of color primaries derived from a scanned original copy, each of said apparatus comprising: input terminals for supplying first signals individually representative of said set of primary color components of a scanned color copy; an input terminal for supplying a second signal representative of a black printer; a plurality of circuit means individually coupled to said input terminals, each effective to derive a signal representative of a predetermined portion of one of said first signals, said portions represented by each of said circuit means being dependent upon a different one of the color coordinates of said given printing color in terms of said set of color primaries; means for developing a third signal representative of the algebraic sum of said second signal and said derived signals, said developed signal being representative of the desired density factor; and means for adding to said developed signal predetermined portions of the corresponding density-factor signals developed by the other apparatus.

References Cited in the file of this patent

UNITED STATES PATENTS

| | | |
|---|---|---|
| 2,434,561 | Hardy et al. | Jan. 13, 1948 |
| 2,757,571 | Loughren | Aug. 7, 1956 |
| 2,947,805 | Moe et al. | Aug. 2, 1960 |
| 2,968,214 | Kilminster | Jan. 17, 1961 |
| 2,976,349 | Thompson | Mar. 21, 1961 |